Patented Sept. 17, 1935

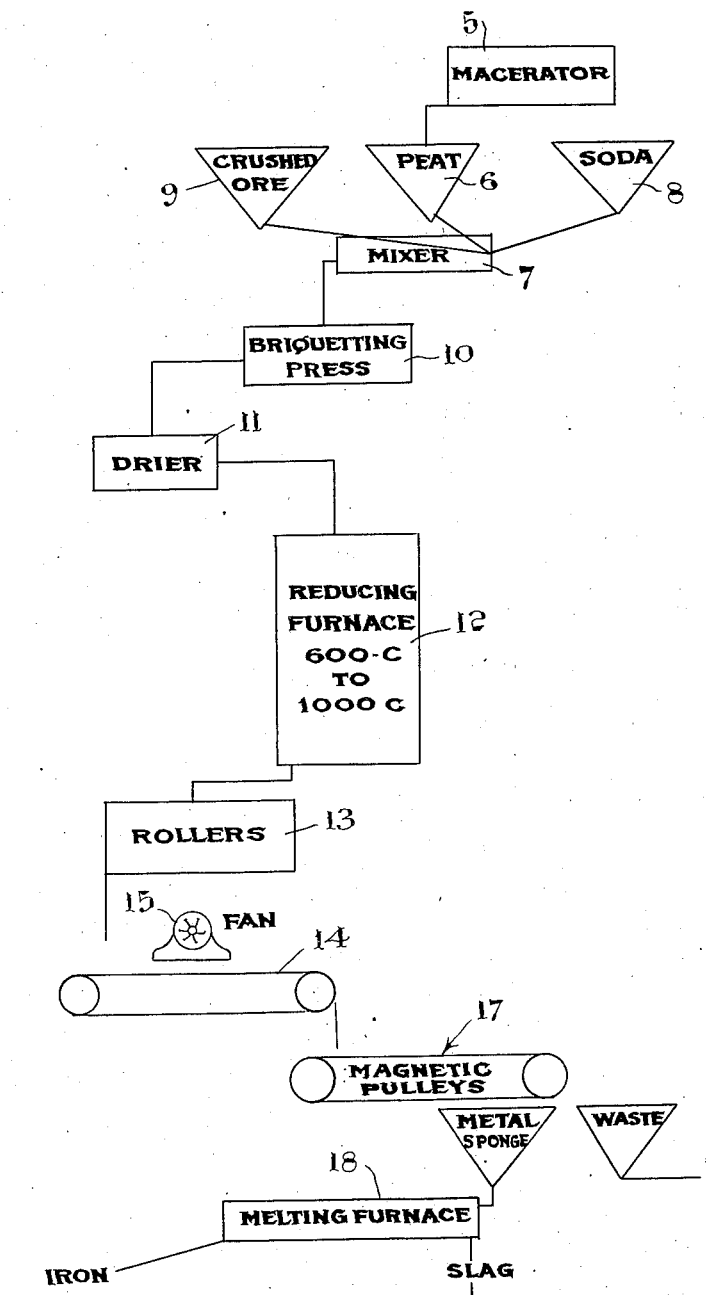

2,014,873

UNITED STATES PATENT OFFICE 2,014,873

PROCESS OF PRODUCING SPONGE IRON

Harry G. Wildman, Westmount, Quebec, Canada

Application November 11, 1933, Serial No. 697,693
Renewed August 8, 1935

4 Claims. (Cl. 75—14)

This invention relates to the production of sponge iron for conversion into pig iron or steel and has for its principal object the economic production of sponge iron of low carbon content from oxide ores containing magnetite and/or hematite.

Another object is the provision of a simple and inexpensive process for producing relatively pure sponge iron of low carbon content from magnetite or hematite ores containing a large amount of titanium, said process being characterized by the fact that the titanium is combined with soda during the reduction to form a slag of titanate of soda from which the titanium oxide and soda are easily recovered by well known methods.

According to the present invention the iron oxides are reduced in the presence of peat humus and soda ash or other suitable alkali at a temperature below the fusion or melting point of the iron oxides. Since the carbon derived from the peat during the reduction process dissolves in iron only at temperatures above the melting point of the iron and since the reduction temperature is kept below this point, it will be evident that the sponge iron produced in accordance with this invention is substantially free of dissolved or included carbon. Owing to the low temperature required for efficient reduction of the iron oxides, it will also be evident that the present process lends itself to the profitable production of sponge iron from low grade iron ores since there is very little heat wasted in raising the temperature of the foreign matter contained in the ore.

In a further description of this invention, reference will be had to the accompanying drawing, in which the single figure is a diagrammatic representation of the apparatus used for practising the process.

In practising this process, the peat humus, containing from 70 to 80% water, is passed through a macerator 5, which it leaves in the form of a brown mud that is conducted to a suitable discharge bin 6. From this bin, the peat humus is delivered to a pug mill or other suitable form of mixer 7 where an alkali, preferably soda ash or caustic soda, drawn from the bin 8, is added in amounts depending upon the character of the iron ore being treated. Usually the quantity of soda added to the macerated peat or brown mud is in the neighbourhood of 2% of the iron content of the ore. Finely divided iron ore, drawn from a bin 9, is also mixed with the macerated peat and soda in the mixer 7, the resulting mixture being then delivered to a briquetting press 10, where it is formed into bricks or briquets and then delivered to a drier 11 and dried until the moisture content of the peat is 25% or less. The dry bricks are then heated in a closed retort or shaft kiln 12 where reduction takes place at a temperature below the fusion point of the iron oxide, such temperature being in the neighbourhood of 600° C. The ash discharged from the retort or shaft kiln 12 is passed through rollers 13 to reduce any lumps that may have been formed and is then conveyed by a belt conveyor 14 or the like beneath a suction fan which serves to remove the light peat ash. The ash carried beyond the suction fan 15 is then conveyed beneath one or more magnetic pulleys 17 to remove the magnetic iron, the residue or silica gangue being carried on past the magnetic pulleys and dumped at some appropriate point. The sponge iron thus obtained is delivered to an electric or other furnace 18 where it is melted and fluxed to remove impurities, the molten iron being then cast into bars as pure pig iron or mixed with suitable alloys to produce a desired grade of steel.

If the ore being treated contains a large amount of titanium the soda content of the briquets may be predetermined so that, during the reduction, the titanium oxide will combine with the soda to form titanate of soda from which the titanium oxide and soda are easily recovered by well known methods.

The use of peat containing approximately 25% moisture and having a calorific value of about 6,080 B. t. u. per pound is an important feature of the present process. Peat is an irreversible colloid which possesses many of the properties of glue or gelatin and I have discovered that the use of peat humus containing a substantial amount of water gives better results than the dry peat and other carbonaceous materials heretofore employed in the reduction of iron oxides. "Peat humus" may be defined as that part of the peat that has undergone complete humidification, and is freed from undecomposed roots, stems, etc. The particles of which the peat humus is composed occur in an extremely fine state of division, generally considered to be molecular, so that when the peat humus is mixed with the iron ore and soda ash in the form of briquets the particles of the peat humus are in very intimate contact with the finely divided iron oxide. This peat humus or colloidal matter dries to a hard horny skin which, when heated in a confined space is decomposed and yields hydrocarbon gases, carbon monoxide and hydrogen, together with a residue of extremely fine amorphous carbon all of which are efficient reduction agents in the reduction of iron oxides to metallic sponge. Carbon, in its denser forms, is rather passive to the oxygen of iron ores but the extremely fine amorphous carbon yielded by the peat humus employed in connection with the present invention is formed in actual contact with the ore and is further activated by the hydrogen present thus bringing about a rapid reduction substantially in accordance with the following equation:—

$$3C + Fe_2O_3 = 2Fe + 3CO$$

The above reaction is characterized by the evolution of large volumes of carbon monoxide gas, part of which is utilized in the reduction of further quantities of the iron ore and part of which escapes from the retort or shaft kiln together with any unused hydrocarbon gases and nitrogen. These evolved gases have a calorific value which enables them to be usefully employed for heating the air employed in the shaft kiln, or for heating the retort in cases where a closed retort is used.

The colloidal properties of the peat humus present in the briquettes made in accordance with the present invention are increased by the presence of a small quantity of alkali and decreased by the presence of mineral acids. Iron ores owing to the presence of a trace of sulphur are generally acid.

In addition to enhancing the colloidal properties of the peat humus the soda ash or caustic soda mixed with the peat and iron ore in accordance with the present invention forms, with the peat, a binding material of sufficient strength to hold the briquets in shape until reduction is complete. The soda by combining with any sulphur or titanium oxide present in the ore, facilitates the liberation of the iron and also enables subsequent recovery of the titanium oxide to be easily effected where this is an important consideration.

Having thus described my invention, what I claim is:—

1. A process of producing sponge iron which comprises mixing an alkali and a finely divided iron oxide ore with peat humus containing a substantial quantity of water, forming the mixture into briquets, drying the briquets until the moisture content of the peat humus is reduced to approximately 25% and effecting reduction of the briquets at a temperature below the fusion point of the iron oxide.

2. A method of producing iron sponge which comprises mixing soda ash and a finely divided iron oxide ore with peat humus having a moisture content considerably in excess of 25%, forming the mixture into briquets, drying the briquets until the moisture content of the peat is reduced to approximately 25% and effecting reduction of the briquets at a temperature below the fusion point of the iron oxides.

3. A process of producing sponge iron which comprises passing peat humus containing 70% to 80% of water through a macerator, adding soda ash and finely divided iron oxide ore to the macerated peat, forming the resulting mixture into briquets, drying said briquets until the moisture content of the peat is 25% or less and effecting reduction of the briquets at a temperature below the fusion point of the iron oxides.

4. A method of producing sponge iron from iron oxide ores containing titanium which consists in effecting reduction of the iron ore in contact with soda ash and peat humus, the latter having a water content in the neighborhood of 25%, said process being characterized by the fact that the soda ash is present in sufficient quantities to combine with the titanium oxide to form a slag of titanate of soda from which the titanium oxide and soda are recoverable by well known methods.

HARRY G. WILDMAN.